Dec. 19, 1961  J. L. BOWER  3,014,134
CONTROL FOR INTENSITY OF ILLUMINATION
Filed Oct. 30, 1957  3 Sheets-Sheet 1

INVENTOR.
JOHN L. BOWER

BY *Lewis L. Humphries*

ATTORNEY

Dec. 19, 1961    J. L. BOWER    3,014,134
CONTROL FOR INTENSITY OF ILLUMINATION
Filed Oct. 30, 1957    3 Sheets-Sheet 2

INVENTOR.
JOHN L. BOWER

BY *Lewis L. Humphries*

ATTORNEY

Dec. 19, 1961          J. L. BOWER          3,014,134

CONTROL FOR INTENSITY OF ILLUMINATION

Filed Oct. 30, 1957          3 Sheets-Sheet 3

*INVENTOR.*
JOHN L. BOWER

BY *Lewis L. Humphries*

ATTORNEY

United States Patent Office 3,014,134
Patented Dec. 19, 1961

3,014,134
CONTROL FOR INTENSITY OF ILLUMINATION
John L. Bower, Downey, Calif., assignor to
North American Aviation, Inc.
Filed Oct. 30, 1957, Ser. No. 693,379
13 Claims. (Cl. 250—205)

This invention relates to a device for controlling the intensity of illumination of a light source and more particularly relates to controlling the intensity of illumination in a photoelectric gage.

It may be appreciated that in a situation wherein a lamp is disposed on one side of one or more gratings and one or more photosensitive devices are disposed on the other side to provide electrical signals indicating the relative motion of the gratings, that any accumulation of dirt, variations in optical density of opaque and transparent portions of the gratings, or variations in locations of opaque and transparent portions relative to a precise, ideal location will cause variation in the amount of light transmitted. These variations, of course, are unrelated to the variations caused by the desired variations in light transmitted as the gratings move relative to each other, and, therefore, it is intended that the undesirable variations be removed, or at least minimized. This device, in overcoming these difficulties, proposes to control the illumination from the light source so as to hold the light transmitted to the photosensitive elements at a constant magnitude or to within allowable limits. The device of the invention therefore aids in providing a photoelectric gage which is insensitive to variation of conditions such as accumulation of dirt on the gage and other shortcomings of the optical elements used in the gage. Should variations in the light occur, such as from dirt, optical shortcomings or in the light source, such as from changes in lamp temperature or change in lamp resistance, the device of the invention will immediately compensate so as to require the lamp to illuminate the photocells with light of the same intensity.

The device of the invention is relatively simple and uncomplicated in its electrical network and utilizes simple circuitry for accomplishing its desired purpose.

It is therefore an object of this invention to provide a control for intensity of illumination.

It is another object of this invention to provide a simplified, economical circuit for controlling the amount of light provided by a light source.

It is a still further object of this invention to provide a photosensitive device for controlling the intensity of illumination of a light source.

A still further object of this invention is to provide a control for intensity of illumination so as to maintain at substantially a constant value the light transmitted through one or more gratings.

It is a still further object of this invention to provide a photoelectric sensing device relatively insensitive to the accumulation of dirt and the optical shortcomings of an optical path.

Another object of this invention is to provide a control for the total amount of illumination received by a plurality of photosensitive elements of a photosensitive optical gage.

Further objects of this invention will become apparent from the following description taken in connection with the accompanying drawings, in which FIG. 1 illustrates an optical system showing a single photoelectric cell receiving light transmitted by a lens through two gratings;

Figure 1:
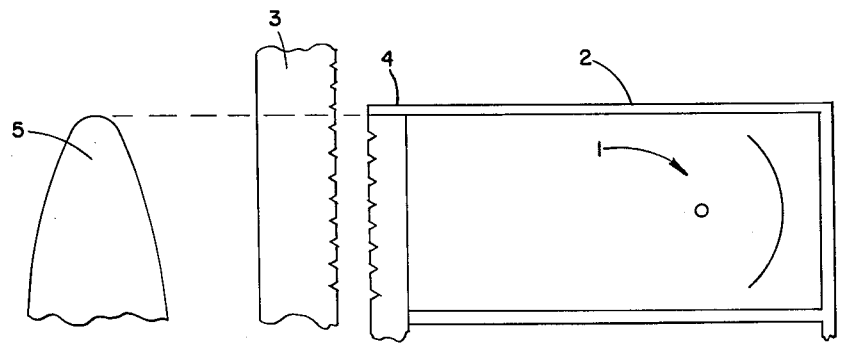

Referring to FIG. 1 which is an example of a photoelectric gage, photosensitive element 1 is located within a case 2 receiving light through gratings 3 and 4 depending upon whether or not they are in or out of registry; and, as they move with respect to each other, the amount of light transmitted to photosensitive element 1 increases and decreases in approximately sinusoidal fashion. The relatively opaque bands on both gratings are equally spaced. The light received by photosensitive element 1 is transmitted through lens 5 (shown only partially).

Figure 2:
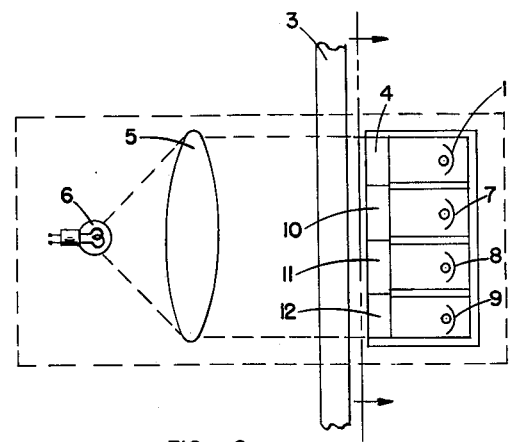
FIG. 2 illustrates four photosensitive cells receiving light from a light source through gratings.

FIG. 2 illustrates lens 5 more fully and shows a light source 6 disposed behind lens 5 to provide light through gratings 3 and 4 to photosensitive devices 1, 7, 8 and 9. The photosensitive devices 7, 8 and 9 have respective gratings 10, 11 and 12 associated therewith. The relatively opaque bands on these gratings are spaced equally apart with those on gratings 3 and 4.

It may be appreciated that many other types of gratings and light occulting means may be utilized. It is desirable, however, that as gratings 4, 10, 11 and 12 move with respect to grating 3 that the light transmitted to each photocell builds up to a maximum, then decreases to a minimum in sinusoidal shape. Grating 10 is displaced with respect to grating 4 so as to provide light to photosensitive element 7, 90° out of phase with the light provided to element 1. The gratings are thus disposed apart one-quarter of a wave length or an odd number of quarter wave lengths as represented by $$\frac{N\lambda}{4}$$

where λ is the distance from one groove to the next and N is any odd number. In FIG. 2, then, the entire device moves relative to grating 3 which is sometimes called the gage rod.

Figure 3:
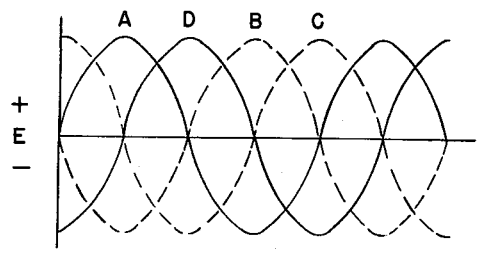
FIG. 3 is an illustration of the output waves of the photosensitive devices of FIG. 4.

FIG. 3 illustrates the electrical output of the photosensitive devices if they are positioned as described above, $$\frac{N\lambda}{4}$$

distance apart. Wave A is received from photosensitive device 1, wave D is received from photosensitive device 7, wave B is received from photosensitive device 8, and wave C is received from photosensitive device 9.

Figure 4:
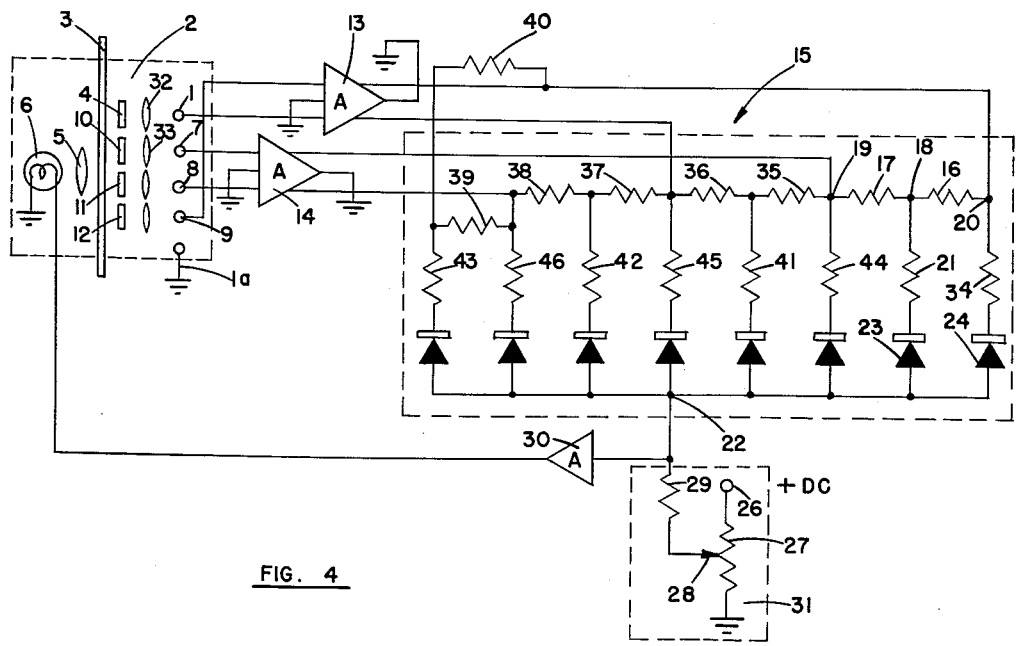
FIG. 4 is an electrical circuit showing control of a light source according to the output of photosensitive elements.

In FIG. 4, the photosensitive elements 1, 7, 8, and 9 all having their common ground return connected to terminal 1a, are illustrated diagrammatically feeding into amplifiers 13 and 14 whose outputs are fed to a resistor network 15 comprised of resistors and diodes. By the network of resistors such as 16 and 17, a potential is obtained at 18 which is midway between that at points 19 and 20. The resistor 21 provides a connection to a common center 22 through diode 23. Similar resistor and diode connections between the output terminals of amplifiers 13 and 14 doubles the four-phase output illustrated in FIG. 3 and provides rectified eight-phase output having an electrical common at point 22. It will be noted that by reason of the diodes such as diodes 23 and 24, the conventional current is allowed to flow only away from electrical center 22. In other words, at point 22, only the negative currents in the resistive device 15 are summed. At point 26 is received a positive direct-current potential which is connected across potentiometer 27 having adjustable wiper 28 providing a positive current through resistor 29 to common point 22. Amplifier 30 then receives the sum of the negative currents summed at point 22 from resistive phase multiplier 15 and from reference current source 31. If the negative currents summed up at point 22 falls to a low level (because of some lowering in light intensity received by photosensitive elements 1, 7, 8 and 9), greater positive current will be sent by amplifier 30 to lamp 6. The intensity of illumination then increases and more light is passed through lens 5, gage rod 3, gratings 4, 10, 11 and 12, and further through lenses such as 32 and 33 to photosensitive elements 1, 7, 8 and 9. The intensity of illumination is thus increased until amplifier 30 detects that the currents at point 22 is equal to the reference set by current source 31. It is desirable, of course, that currents be equalized in all phases of phase multiplier 15 and therefore resistors such as 16 and 17 must bear definite relationship to resistors such as 21 and 34. It has been found that a desirable relationship between resistors may be as follows:

$$R_{21} + \frac{R_{16}}{2} = R_{34} \frac{\sqrt{2}}{2}$$

where $R_{16}$ is the resistance of resistors such as 16, 17, 35, 36, 37, 38, 39 and 40; $R_{21}$ is the resistance of resistors such as 21, 41, 42 and 43; and $R_{34}$ is the resistance of resistors such as 34, 44, 45 and 46.

Amplifier 30 has a large gain; the output of amplifier 32, therefore, will increase or decrease so as to hold the electrical currents at point 22 equal to the reference current provided by source 15.

Figure 5:
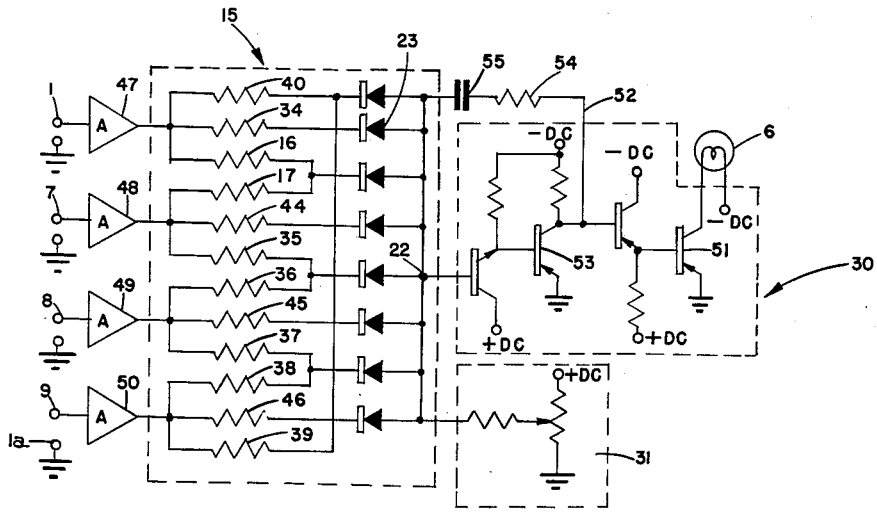
FIG. 5 is a modified electrical schematic of the device of FIG. 4.

In FIG. 5 is illustrated a slightly different schematic providing the device of the invention. Amplifiers 47, 48, 49 and 50 are connected to receive the outputs of photoelectric devices 1, 7, 8 and 9, respectively. Phase multiplying device 15 provides eight phases as before, rectifying the currents and summing them at point 22. However, the resistive network is modified by the removal of certain resistors shown in FIG. 4 and by adjustment in value of the remaining resistors. Resistors 21, 41, 42 and 43 of FIG. 4 are reduced to zero in FIG. 5, and resistors 16, 17, 35, 36, 37, 38, 39 and 40 bear a particular relationship to resistors 34, 44, 45 and 46 of $$\frac{\sqrt{2}}{1}$$

That is, the value of resistor 16, for example, equals $\sqrt{2}$ times the value of resistor 34. Amplifier 30 which compares the negative currents summed at point 22 with the positive currents provided by reference device 31 is illustrated as being transistorized with the final transistor 51, driving lamp 6, controlling the output light of the lamp. For stability purposes, feedback loop 52 is connected from transistor 53 through resistor 54 and capacitor 55 to the line connected to junction point 22. Diodes such as diode 23 are not critical and substantially any diode having fairly uniform forward drop and a minimum of inverse current may be used.

It may be appreciated that what is herein accomplished is that the output signal indicating the amount of light received by the photosensitive elements is converted into a plurality of phases. Rectification and summation of currents of the several phases is obtained. The summed currents are then compared with a reference to determine the amount of light being provided. It may be appreciated that the larger the number of phases, the more evenly the current will flow in junction 22.

Figure 6:
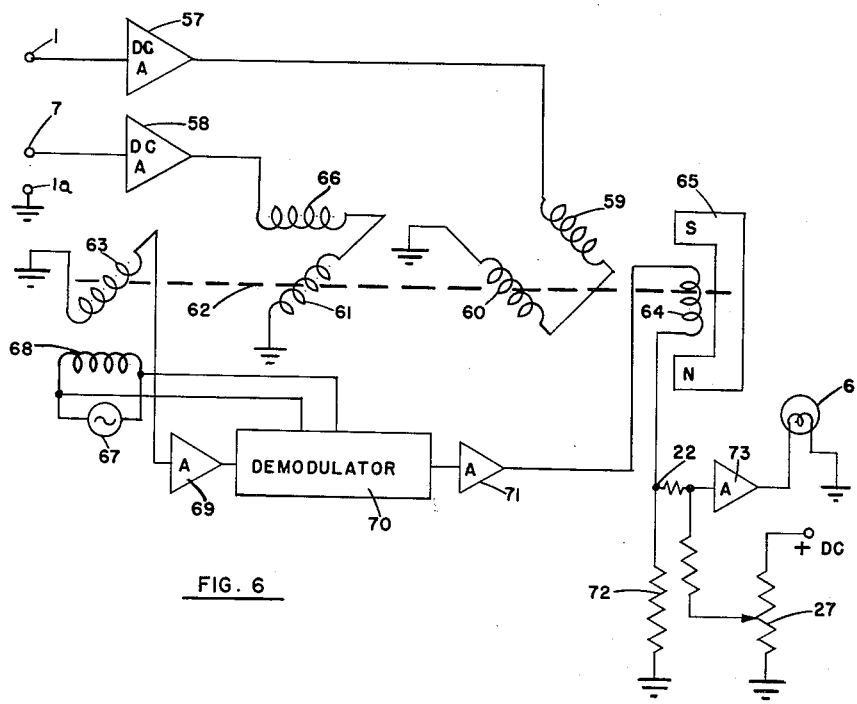
FIG. 6 is an electrical schematic of another embodiment of the device of the invention.

FIG. 6 is another embodiment of the invention. Photocells 1 and 7 have a common ground terminal 1a providing signals to D.-C. amplifiers 57 and 58, respectively. Photocells 1 and 7 are displaced 90° with respect to each other, that is, the light received by each from the light producing means is 90° out of phase with the light received by the other. The output of amplifiers 57 and 58 are sent to stationary coils 59 and 66, respectively, and then to rotatable coils 60 and 61 which are mounted on shaft 62, which are further connected to the ground. Coils 63 and 64 are also disposed on shaft 62. Coil 64 is disposed within the magnetic field of magnet 65. Alternating-current source 67 excites coil 68 and a signal is thus induced in secondary coil 63 which is transmitted to amplifier 69 in the form of an alternating current signal indicating the position of shaft 62. Demodulator 70 transforms the alternating-current signal into direct current, and the direct-current amplifier 71 transmits the direct-current signal to junction point 22 through coil 64. The direct-current output of amplifier 71 produces a current which flows in coil 64 which together with magnet 65 causes a restoring torque on shaft 62 until shaft 62 is restored to the position at which the voltage on 68 is zero, in which condition, the sum of torques from 60, 61 and 64 is zero. The torque created by the signals from amplifiers 57 and 58 is proportional to the sum of the squares of the current flowing in coils 60 and 61. At this condition, the current flowing through coil 64 is proportional to the sum of the squares of the currents flowing in coils 60 and 61. Resistor 72 connects junction 22 to ground. Potentiometer 27 having a direct-current source connected thereto provides amplifier 73 with a reference voltage to be combined with the voltage received from junction 22. Amplifier 73 operates in the same manner as amplifier 30 of FIG. 4.

In FIG. 6, a torque is placed on shaft 62 according to the square of the current flowing from amplifier 57. A torque is also placed on shaft 62 according to the square of the current from amplifier 58. A voltage proportional to the sum of these squares is caused to appear at terminal 22. The current proportional to the sum of the squares of the current from amplifiers 57 and 58 is constant regardless of the variation of each as sine and cosine waves. Consider two waves received from photosensitive devices 1 and 7 of maximum magnitude K and of sinusoidal shape and 90° out of phase with respect to each other:

Wave 1 = $K \sin \theta$
Wave 2 = $K \cos \theta$
Wave $1^2$ + Wave $2^2 = K^2 \sin^2 \theta + K^2 \cos \theta$
Wave $1^2$ + Wave $2^2 = K^2$ because $\sin^2 \theta + \cos^2 \theta = 1$ Therefore, the sum of the squares of two waves such as these is a constant, or should be if no outside factor such as dirt or reduction in light intensity occur. Therefore, the voltage at terminal 22 represents the value K (or $K^2$ both of which should remain constant) and measures this value against a reference.

Figure 7:
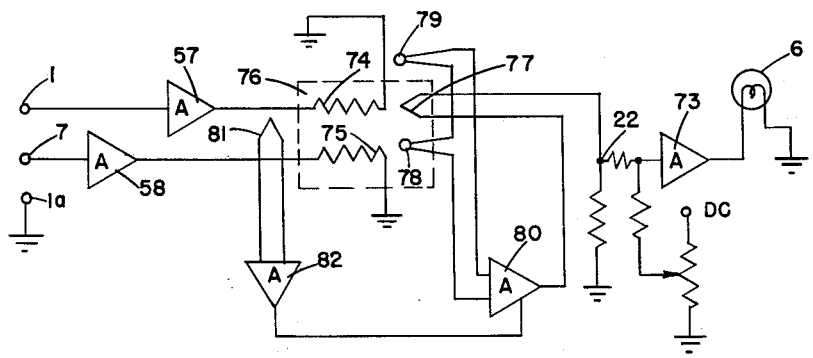
FIG. 7 is another schematic of the device of FIG. 6.

FIG. 7 is a further figure illustrating another manner of combining two phases and obtaining the square root of the sum of the squares. Amplifiers 57 and 58 receive signals from photosensitive elements 1 and 7 and in this embodiment excite resistor heating elements 74 and 75 contained within a compartment 76. Also contained within this compartment is a Peltier thermocouple 77 and a standard thermocouple 78. Just outside the compartment is a standard thermocouple 79 which is connected in series with thermocouple 78 to the input of amplifier 80 which provides an output signal to filter thermocouple 77 indicating any difference in output between thermocouple 78 and 79.

Thermocouple 77 withdraws heat from within compartment 76 until there is no difference between the output of thermocouples 78 and 79. The current provided by amplifier 80 is proportional to the sum of the squares of currents provided by amplifiers 57 and 58. This current is provided to junction point 22 which provides signals to amplifier 73 to control lamp 6 in the manner described in the previous embodiment of FIG. 6. The fourth thermocouple 81 is provided outside compartment 76 for ambient temperature compensation. Amplifier 82 receives the output of this thermocouple and controls the bias of amplifier 80 in accordance therewith. This bias may, for example, be obtained by controlling a second grid in a multigrid tube included within amplifier 80. Temperature compensation may also be obtained by maintaining the ambient temperature constant.

It may be appreciated that in all of the embodiments shown, that a multiphase signal is produced, that the signal or effects of the signal are combined, and that the light source is controlled from this combined signal. The device of the invention operates, of course, equally well with gage photosensing structure which provides a multiple phase signal.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a photoelectric gage, a light producing element, a plurality of optical gratings, a plurality of photosensitive elements disposed to receive light through said gratings from said light producing elements, said photosensitive elements being disposed so that the light received by each is displaced in phase with respect to the light received by the others, means combining the output of said photosensitive elements into a multiphase electrical signal, said means comprising a resistive network, reference current means, and means for controlling the intensity of said light producing element according to the difference in current flowing in said resistor network and the reference current provided by said reference current means.

2. In combination a light producing element, a plurality of gratings, one of which is adapted to move with respect to the other, four photosensitive elements disposed to receive light from said light producing means through said grating means, each of said photosensitive elements receiving light displaced in phase 90° with respect to the light received by another, means providing a multiphase electrical signal from the output of said photosensitive elements, rectifier means disposed to rectify said multiphase electrical signal, current summing means connected to receive the output current of said rectifier means, reference current means, and amplifier means connected to receive the difference between said reference current means and said current summing means to control the light output of said light producing element.

3. In a photoelectric gage, a light producing element, a plurality of optical gratings, a plurality of photosensitive elements disposed to receive light through said gratings from said light producing element, said photosensitive elements receiving light displaced in phase with respect to the amount of light received by the others, means combining the output of said photosensitive elements into a multiphase electrical signal, said latter means providing an electrical common for said multiphase electrical signal, diode means disposed to provide unidirectional flow of current through said electrical common, and means for controlling the intensity of said light producing means in accordance with the current flowing in said electrical common.

4. In a photoelectric gage, a light producing element, a plurality of optical gratings, a plurality of photosensitive elements disposed to receive light through said gratings from said light producing element, each of said photosensitive elements receiving light displaced 90° in phase with respect to the amount of light received by another, means combining the output of said photosensitive elements into a multiphase electrical signal, said latter means providing an electrical common for said multiphase electrical signal, diode means disposed to provide unidirectional flow of current through said electrical common, reference current means, and means for controlling the intensity of said light producing means according to the difference in current flowing in said electrical common and the reference current provided by said reference current means.

5. The combination recited in claim 4 wherein said diodes are directed to allow current flow away from said electrical common and said reference means providing positive electrical current.

6. In combination, light producing means, two photosensitive elements, light occulting means adapted for movement between said light producing means and said photosensitive elements, means for combining the output of said photosensitive elements into a multiphase electrical signal, mans for combining the output into a two phase electrical signal, means for squaring each of the electrical signals comprising a two-phase pair, means for summing the output of said squaring means, and means for controlling said light producing means in response to the output of said means for summing.

7. In combination, a light producing element, a plurality of gratings, at least one of which is adapted to move with respect to the other, four photosensitive elements disposed to receive light from said light producing means through said grating means, each of said photosensitive elements being disposed so as to receive light displaced in phase 90° with respect to another, resistor means connected to receive the output of said photosensitive elements and provide an electrical common and an eight phase voltage with respect thereto, diode means disposed in each connection to the electrical common, means for controlling the light output of said light producing element in response to the current flowing in said electrical common.

8. In combination, a light producing element, a plurality of gratings, at least one of which is adapted to move with respect to the other, four photosensitive elements disposed to receive light from said light producing means through said grating means, each of said photosensitive elements being disposed so as to receive light displaced in phase 90° from another, resistor means connected to receive the output of said photosensitive elements and provide an electrical common and an eight phase voltage with respect thereto, diode means disposed in each connection to said electrical common, electrical reference means, and means connected to receive the difference in electrical signals between said electrical reference and said electrical common for controlling the light output of said light producing means.

9. In combination, light producing means, grating means, a plurality of photosensitive elements positioned so that the light received by each element is displaced in phase with respect to the light received by the others, said light originating in said light producing means and being received through said grating means, means comprising a resistive network for producing from the output of said photosensitive elements a multiphase electrical signal, and means for controlling the intensity of illumination of said light producing means in response to said means for producing a multiphase electrical signal.

10. The combination recited in claim 9 wherein said means for controlling the intensity of illumination comprises means for comparing the multiphase electrical signal with a reference signal.

11. In combination, light producing means, a plurality of photosensitive elements, light occulting means for providing multiphase light signals adapted for movement between said light producing means and said photosensitive elements, each of said photosensitive elements being positioned to receive a different phase of said light signals, means comprising a network of resistors for producing from the output of said photosensitive elements a multiphase electrical signal, and means for controlling the illumination provided by said light producing means in response to said multiphase electrical signal, said means for controlling the illumination being connected to receive the sum of currents through at least a portion of said resistors.

12. In combination, light producing means, a plurality of photosensitive elements, light occulting means for providing multiphase light signals adapted for movement between said light producing means and said photosensitive elements, each of said photosensitive elements being positioned to receive a different phase of said light signals, means comprising a network of resistors and diodes for producing from the output of said photosensitive elements a multiphase electrical signal, and means for controlling the illumination provided by said light producing means in response to said multiphase electrical signal, said means for controlling the illumination being connected to receive the sum of currents through said diodes.

13. In combination, light producing means, a plurality of photosensitive elements, light occulting means for providing multiphase light signals adapted for movement between said light producing means and said photosensitive elements, each of said photosensitive elements being positioned to receive a different phase of said light signals, means comprising a network of resistors and diodes for producing from the output of said photosensitive elements a multiphase electrical signal, and means for controlling the illumination provided by said light producing means in response to said multiphase electrical signal, said means for controlling the illumination being connected to receive the sum of currents through diodes, said means for controlling the illumination further comprising means for comparing the sum of currents through said diodes with a reference current.

References Cited in the file of this patent

UNITED STATES PATENTS

| | | |
|---|---|---|
| 2,193,789 | Braselton | Mar. 19, 1940 |
| 2,238,762 | Whitaker | Apr. 15, 1941 |
| 2,494,607 | Bouchet | Jan. 17, 1950 |
| 2,537,914 | Roop | Jan. 9, 1951 |
| 2,594,514 | Sweet | Apr. 29, 1952 |
| 2,628,317 | Singer | Feb. 10, 1953 |
| 2,878,395 | Mindheim | Mar. 17, 1959 |
| 2,886,717 | Williamson et al. | May 12, 1959 |